Patented Aug. 21, 1934

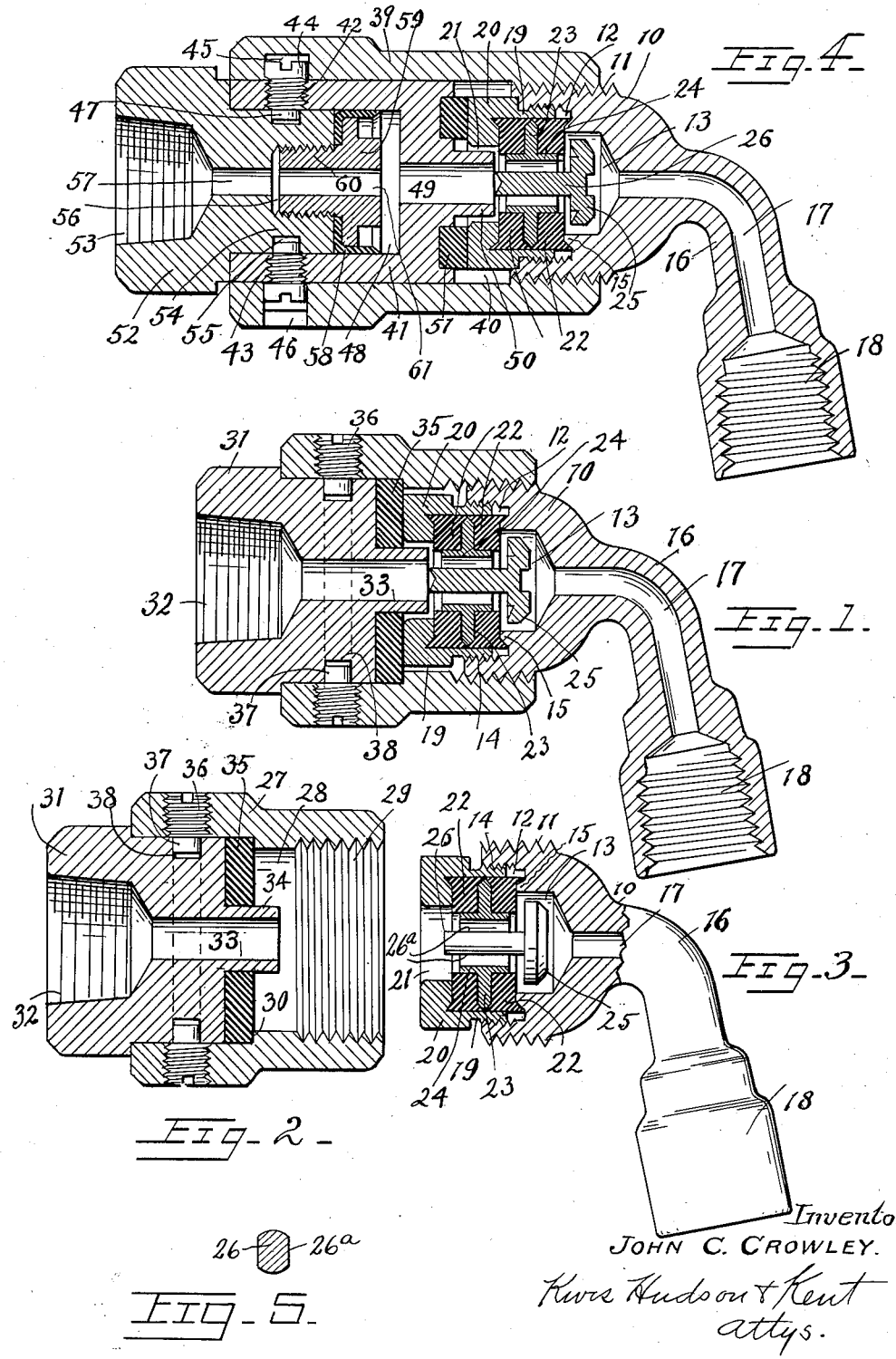

1,971,132

UNITED STATES PATENT OFFICE 1,971,132

COUPLING CONNECTION FOR AIR LINES

John C. Crowley, Cleveland Heights, Ohio, assignor to The Dill Manufacturing Company, Cleveland, Ohio, a corporation of Ohio Application January 21, 1932, Serial No. 587,909

3 Claims. (Cl. 284—17)

This invention relates to a coupling particularly adaptable for use with air lines of tire or other article inflating apparatus to connect together the sections of the lines.

The tire inflating equipment now used in most service stations includes, as a part of the air line, such articles or accessories as long lengths of air hose and expensive air chucks and air gauges permanently connected to the air hose. These parts and accessories are often stolen if allowed to remain out at night at service stations which do not maintain all night service.

An object of the invention is to provide a coupling whereby a substantial part of the air hose of tire or other inflating equipment, together with the accessories carried thereby, can be quickly and readily disconnected from a section of the air hose that is connected to the source of supply of air pressure.

Another object is to provide a coupling, such as specified in the above mentioned object, wherein the coupling part that is carried by the section of the air hose which is connected to the source of supply of the air pressure constitutes an air chuck capable of being directly applied to the valve stem of a pneumatic tire.

A further object is to provide a coupling such as specified in the foregoing objects and which is so constructed that the flexible washer of the air chuck part of the coupling is not subjected to contact with the other parts of the coupling and does not act as the sealing medium between the coupling parts.

Additional and further objects of the invention will become apparent during the following description of two embodiments of the invention which are illustrated in the accompanying drawing and wherein, Figure 1 is an enlarged longitudinal section through one form of the coupling construction, Figs. 2 and 3 are enlarged detailed sectional views, respectively, of the main coupling parts and should be taken together to show said parts just prior to assembly, Fig. 4 is a view similar to Fig. 1 but showing a modified form of coupling construction, and Fig. 5 is a cross sectional view through the valve pin.

Referring to Figs. 1 and 3, the coupling part which is connected to the section of the air hose that is attached to the source of supply of air pressure is in the form of an air chuck and will be so designated herein. This air chuck coupling part comprises a head 10 externally threaded at 11 and provided with a large counterbore 12 and a small counterbore 13. The large counterbore 12 is threaded, as indicated at 14, and has a tapered outwardly extending annular rib 15 at its bottom and surrounding the counterbore 13. A neck portion 16 extends from the head 10 and is preferably angularly disposed with respect thereto, such neck portion being provided with a bore 17 in communication with the small counterbore 13 in the head and with a threaded recess 18 in the enlarged outer end of the neck 16. It will be understood that the air hose is connected to the chuck part by means of a suitable fitting screwed into the threaded recess 18 at the end of the neck 16.

A nut 19 is screwed into the threaded counterbore 12 and is provided at its outer end with a head 20 of less external diameter than the external diameter of the head 10. The head 20 of the nut 19 is provided with a central reduced opening 21, while a pair of gaskets 22 are carried by the nut and support between them the outwardly extending flange 23 of a sleeve 24, it being noted that the opening 21 and sleeve 24 constitute a continuous passage through the nut and into the counterbore 13. When the nut 19 is screwed tightly into the head 10 it will be seen that the gaskets 22 are compressed and engage the flange 15 and the head 20 of the nut with an air-tight engagement and securely support the sleeve 24. The air chuck valve includes an enlarged valve head 25 located in the counterbore 13 of the head 10 and a pin 26 extending through the sleeve 24 and into the opening 21 in the head 20 of the nut and preferably provided with diametrically opposed longitudinally extending flats 26ᵃ. It will be understood that the air pressure in the air line will normally maintain the valve head 25 seated on the innermost gasket 22 and that inward movement of the valve pin 26 will cause said valve head to be unseated and allow the air pressure to flow outwardly of the chuck through the sleeve 24 and opening 21 in the nut head 20.

The chuck part of the coupling is substantially of conventional air chuck construction and in addition to forming an effective valve sealing means when the removable coupling part is disconnected therefrom, it can be used in the same way as an ordinary air chuck and may be applied to the end of a valve stem. This is an important consideration since the chuck part of the coupling could be connected to a short flexible air hose that could be allowed to remain out at all times for use when the service station is closed.

The removable part of the coupling comprises a sleeve 27, the bore 28 of which is threaded adjacent one end, as indicated at 29, and is enlarged adjacent its opposite end to provide an internal shoulder 30 intermediate its ends. A member 31, having a reduced portion that interfits with the enlarged portion of the bore 28 in the sleeve 27, is connected to an end of the removable air hose by means of a suitable fitting screwing into an enlarged threaded counterbore 32 formed in the member 31 and communicating with a bore 33 extending through said member and through a central tubular extension 34 formed on the inner end of the member. The member 31 has its reduced portion inserted within the enlarged portion of the bore 28 of the sleeve 27, while a flexible gasket 35 mounted on the tubular extension 34 is compressed adjacent its outer edge between the inner end of the member 31 and the internal shoulder 30 of the sleeve 27.

It is proposed to swivelly connect the sleeve 27 and the member 31 by means of a plurality of set screws 36 screwed into openings formed in the sleeve 27 and having at their inner ends turned down portions 37 which extend into an external annular groove 38 formed in the reduced part of the member 31.

When it is desired to connect the two coupling parts, the sleeve 27 is fitted over the chuck head 10 and is rotated to screw the two coupling parts tightly together, or until the head 20 of the nut 19 engages the gasket 35 carried by the member 31. When the head 20 of the nut 19 engages the gasket 35, the projection 34 extends into the opening 21 in the head 20, but terminates short of the gasket 22 of the chuck. As previously mentioned, the valve pin 26 is provided with a pair of diametrically opposed flats and is of such diameter that it will be pushed inwardly of the chuck by its internal engagement with the tubular extension 34 to unseat the valve head 25, although, of course, a smaller valve pin could be used which would engage with an abutment or pin in the extension 34 to unseat the valve head 25.

In the form of the invention shown in Fig. 4, the chuck part of the coupling is exactly the same as that shown in Figs. 1, 2 and 3 and the same reference characters are used to designate the corresponding elements.

The coupling part that is connected to the removable section of the air hose in the form shown in Fig. 4, comprises an elongated sleeve 39, the bore 40 of which is threaded adjacent one end to enable the sleeve 39 to be screwed to the external threads 11 of the head 10 of the chuck part of the coupling. A member 41 of less length than the sleeve 39 rotatably fits in the bore 40 thereof, being swivelly retained in position therein by screws 42 arranged in tapped openings 43 spaced circumferentially of the member 41, the heads 44 of said screws 42 projecting into an internal annular groove 45 in the sleeve 39, it being noted that a hole 46 in the sleeve 39 provides for the assembly of the screws 42. The screws 42 have turned-down inner ends 47 which extend into a counterbore 48 in the member 41. A bore 49 communicating with the counterbore 48 extends through the member 41 and through a centrally arranged projection 50 located at the inner end of the member 41, which inner end is provided radially outward of the projection 50 with an annular groove in which is secured a gasket 51.

A member 52 having a threaded recess 53 for receiving a fitting connecting said member with the removable air hose section is provided with a reduced portion 54 rotatably fitting the counterbore 48 of the member 41 and held against endwise movement therein by the turned-down inner ends 47 of the screws 42 which engage in an external annular groove 55 formed in the reduced portion 54. The reduced portion 54 terminates outwardly of the inner end of the counterbore 48 and is provided with a threaded counterbore 56 which is in communication with the recess 53 by means of a bore 57.

A cup-shaped flexible packing 58, fitting the counterbore 48, is clamped between the inner end of the reduced portion 54 of the member 52 and the head 59 of a securing part which has a threaded extension 60 screwed into the counterbore 56, said securing part being provided with a bore 61 communicating with the bore 57 and counterbore 48.

The sleeve 39 is screwed upon the head 10 of the air chuck part when it is desired to connect together the coupling parts, the member 41 being moved toward the chuck part until the gasket 51 engages the head 20 of the nut 19 with an airtight engagement. The projection 50 will then extend into the opening 21 but without being in contact with the chuck gasket 22, the chuck valve head 25 being unseated as in the form of the invention previously described. Since the members 41 and 52 are swivelly connected it will be seen that the air hose connected to the member 52 is free to be turned without twisting while the cup-shaped gasket 58 provides an air-tight connection between the members.

In both forms of the invention disclosed herein a coupling is provided which enables a quick connection to be made between the coupling parts. Since the removable coupling part does not contact with the gasket of the air chuck part of the coupling, the chuck can be used as an ordinary air chuck in that wear upon the chuck gasket, due to repeated applications to valve stems, will not affect the air seal between the coupling parts. It will also be noted that in both forms of the invention there is disclosed a novel and efficient way of swivelly connecting the elements of the removable coupling part.

Although several preferred forms of the invention have been illustrated and described herein, it should be understood that the invention may take various other forms within the scope of the appended claims.

Having thus described my invention, what I claim is:

1. In a coupling of the character described, a coupling part in the form of an air chuck and comprising a head having a counterbore, a nut secured in said counterbore and extending outwardly of the outer end thereof, packing held in said counterbore by said nut and having an exposed portion adapted to engage the end of a tire valve stem to form a seal when the air chuck is applied thereto, and a valve having a head located inwardly of said packing and a pin extending outwardly thereof, and a second coupling part comprising a sleeve adapted to fit over and be detachably connected to the head of said chuck part, a member having a portion rotatably fitting the bore in said sleeve, said member and said sleeve having cooperating elements swivelly connecting the same together, means at the inner end of said member adapted to extend into the nut of the chuck and engage said valve pin to unseat said valve head, but terminating short of said packing and packing on the inner end of said member and surrounding said last named means adapted to engage the outer face of the nut of said first named part.

2. A coupling of the character described comprising, in combination, a coupling member in the form of an air chuck capable of being separately applied to the valve stem of an inflatable article to connect an air line thereto and including a packing adapted to engage the end of the valve stem to form a seal and a normally seated valve, and a coupling member detachably connected to said first named member and provided with means terminating short of said packing for maintaining said valve unseated and with packing cooperating with said first named member to form an air seal between the said members.

3. A coupling of the character described comprising, in combination, a coupling member in the form of an air chuck capable of being separately applied to the valve stem of an inflatable article to connect an air line thereto and including a sealing packing and a valve normally seated thereon, and a coupling member detachably connected to said first named member and including two swivelly connected parts one of which is provided with means always out of contact with said packing for holding said valve unseated, said second member being provided with a packing cooperating with said first named member to form an air seal between the members.

JOHN C. CROWLEY.